H. B. ROUSE.
PLATE HOLDER.
APPLICATION FILED JULY 10, 1907.
921,005.
Patented May 11, 1909.
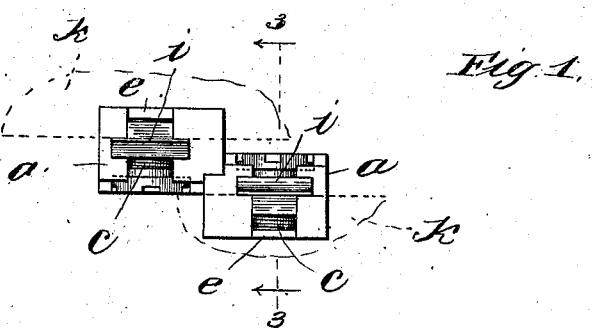
Fig. 1.
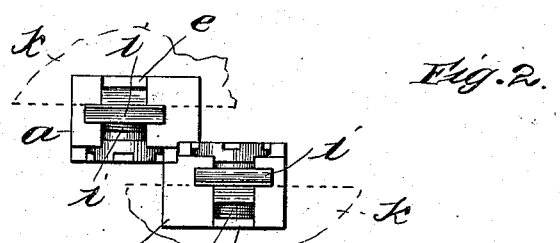
Fig. 2.
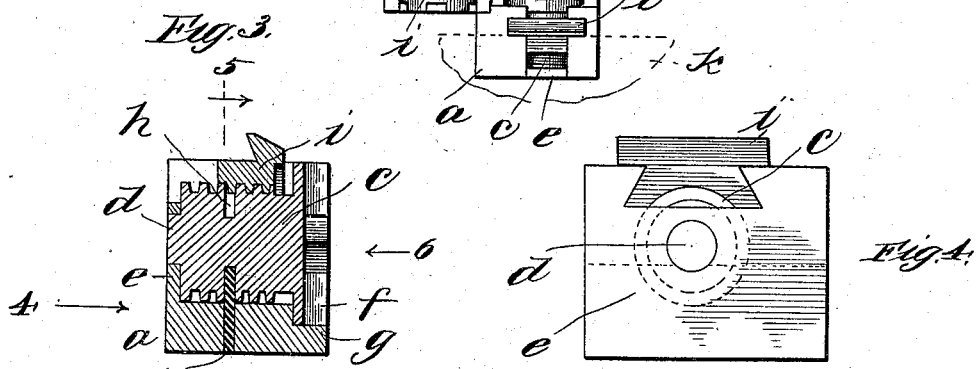
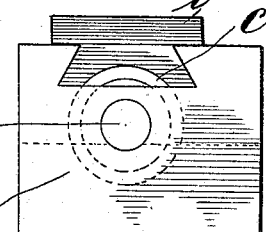
Fig. 3. Fig. 4.
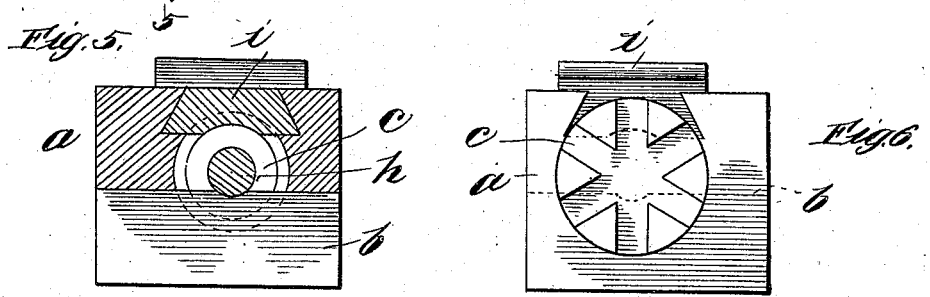
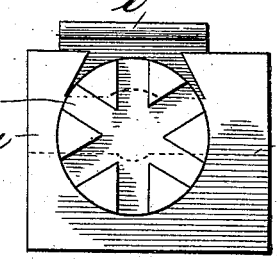
Fig. 5. Fig. 6.
Witnesses
Inventor
Harry B. Rouse,
By G. L. Cragg
Atty

UNITED STATES PATENT OFFICE.

HARRY B. ROUSE, OF CHICAGO, ILLINOIS.

PLATE-HOLDER.

No. 921,005.

Specification of Letters Patent.

Patented May 11, 1909.

Application filed July 10, 1907. Serial No. 383,009.

*To all whom it may concern:*

Be it known that I, HARRY B. ROUSE, citizen of the United States, residing at Chicago, in the county of Cook and State of Illinois, have invented a certain new and useful Improvement in Plate-Holders, of which the following is a full, clear, concise, and exact description, reference being had to the accompanying drawings, forming a part of this specification.

My invention relates to printing plate holders, and has for its object the provision of improved structural characteristics of such holders which will be more readily understood by reference to the accompanying drawing and which will be pointed out in the appended claim.

In the drawing—Figure 1 is a plan view showing two printer's blocks constructed in accordance with the invention and assembled in one way. Fig. 2 shows another rearrangement of the blocks illustrated in Fig. 1. Fig. 3 is a sectional view on line 3 3 of Fig. 1, showing but one block, however. Fig. 4 is a view of a block in the direction of arrow 4 of Fig. 3. Fig. 5 is a sectional view on line 5 5 of Fig. 3. Fig. 6 is an end view of a printer's block in the direction of arrow 6 of Fig. 3.

Like parts are indicated by similar characters of reference throughout the different figures.

In practicing certain characteristics of my invention, I employ a solid one-piece block $a$ that has a recess led into the same, in which recess a key of suitable shape, such as the plate $b$, is inserted, the recess being desirably in the form of a slot extending from side to side of the block for cheapness of manufacture and effectiveness in construction. Where the slot is employed, the plate $b$ may be very tightly driven into position. The block $a$ is provided with a bore that is open at its top portion, and in which is disposed a threaded shaft $c$, which threaded shaft is desirably of a diameter that will permit contact of the bore surface with the threads thereof, whereby the bore may in itself act as a bearing for the shaft, by reason of such engagement of the threads of the shaft. It may be desired also to provide additional bearing support for the shaft, in which event the shaft may be reduced at $d$, there engaging a corresponding opening in an end wall $e$ of the block which is formed when the shaft is to have further bearing than is afforded by the direct engagement of its threads with the bore of the block. While the shaft is provided with a supplemental bearing at one end, at $e$, it may also have a supplemental bearing at the other end by having the head $f$ of the shaft bear upon the surface formed in the enlargement $g$ of the block bore.

The shaft is provided with an annular groove $h$ located between its ends, circumscribing the same and being endless, the groove thus being located in a single plane perpendicular to the axis of the shaft. This groove receives the key $b$, said key performing the function of preventing longitudinal movement of the shaft with respect to the block, as said shaft is turned by means of a suitable tool applied to the head $f$.

The traveling jaw $i$ of the block has its base portion in dove-tail fit with the block, as indicated clearly in Figs. 4 and 5, whereby said hook is prevented from being moved vertically with respect to the block, the base portion of the hook being threaded to engage the thread upon the shaft. It will be seen that when the head is turned in one direction, the hook will be moved outwardly, and when turned in the other direction, will be moved inwardly, unclamping and clamping the plate that may be immediately in front of the jaw of the hook.

The key $b$, as stated, preserves the longitudinal relation of the shaft with respect to the block, this being accomplished irrespective of the load that may be imposed upon the hook.

I believe it to be novel with me to thus construct a printing plate holder with a block made in one piece having a recess therein through which a key is passed into engagement with an annular groove in an operating shaft. The advantages of this construction must be very apparent. The construction is structurally simple, very strong, and will not become impaired because there are no parts of the block to become separated. These advantages are very important. Particularly do I believe it to be new with me to provide the key in engagement with the shaft in a construction wherein the base of the hook extends only partially about the shaft, about the upper portion thereof, so as to permit the hook to travel bodily the length of the shaft without being obstructed by the key, and I desire to claim this construction broadly whether the block is made only in one piece or not.

Another feature of the invention resides in cutting away a corner of each block, so that the blocks may be closely approached, as indicated in Fig. 1, while at the same time bringing their jaws into such position that adjacent plates, indicated at k, may be placed close together. The cut away corner portion has the shape desirably indicated in the lower right-hand corner of the left-hand block in Fig. 1 and the upper left-hand corner in the right-hand block of Fig. 1. This shaping of the corners of the two blocks permits another relative arrangement of the blocks indicated in Fig. 2. A block thus shaped may be described as having a right-angular recess in a vertical corner portion thereof.

It will be seen that I have provided a printing plate holder including a hollow block, a threaded operating shaft journaled in the hollow of said block and provided with an annular groove in the midst of its threaded portion, said block being vertically apertured through its bottom in the plane of said annular groove, a key inserted through the aperture in the bottom of the block and within the annular groove in the shaft, said shaft having means for permitting the engagement thereof with an operating tool applied from above, whereby the shaft may be rotated, the key, by engaging the shaft, preventing the longitudinal movement of the shaft, and a traveling jaw moving above the block and in engagement with the threaded portion of the shaft, whereby as the shaft is rotated in a fixed plane, the jaw is caused to advance or recede according to the direction of rotation of the shaft, said jaw having engagement with a limited peripheral portion of the shaft so as to permit the jaw to travel over the key.

It is obvious that changes may readily be made in the device of my invention, without departing from the spirit thereof, and I do not, therefore, wish to be limited to the precise construction shown, but,

Having thus described my invention, I claim as new and desire to secure by Letters-Patent the following:—

A printing plate holder including a hollow block, a threaded operating shaft journaled in the hollow of said block and provided with an annular groove in the midst of its threaded portion, said block being apertured through its bottom in line with the said annular groove, a key inserted through the aperture in the bottom of the block and within the annular groove in the shaft, said shaft having means for permitting the engagement thereof with an operating tool applied from above, whereby the shaft may be rotated, the key, by engaging the shaft, preventing the longitudinal movement of the shaft, and a traveling jaw moving above the block and in engagement with the threaded portion of the shaft, whereby as the shaft is rotated in a fixed plane, the jaw is caused to advance or recede according to the direction of rotation of the shaft, said jaw having engagement with a limited peripheral portion of the shaft so as to permit the jaw to travel over the key.

In witness whereof, I hereunto subscribe my name this seventh day of July A. D., 1907.

HARRY B. ROUSE.

Witnesses:
 L. G. STROH,
 G. L. CRAGG.